United States Patent
Lehmberg et al.

(10) Patent No.: US 6,413,570 B1
(45) Date of Patent: Jul. 2, 2002

(54) TEA CONCENTRATE

(75) Inventors: Gregg Lance Lehmberg, Westfield; Martin John Spisak, Parlin; Steven Alphonse Gobbo, Secaucus; Meghan Mary Kemly-Ellingham, Harrington Park, all of NJ (US)

(73) Assignee: Lipton, division of Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 09/501,172

(22) Filed: Feb. 9, 2000

Related U.S. Application Data

(60) Provisional application No. 60/119,729, filed on Feb. 12, 1999.

(51) Int. Cl.[7] .................................................. A23F 3/00
(52) U.S. Cl. .................................... 426/597; 426/330.3
(58) Field of Search ............................... 426/597, 330.3

(56) References Cited

U.S. PATENT DOCUMENTS

| | | | |
|---|---|---|---|
| 4,051,267 A | | 9/1977 | Jongeling |
| 4,478,939 A | | 10/1984 | Alder-Nissen et al. |
| 4,483,876 A | | 11/1984 | Petersen |
| 4,748,033 A | | 5/1988 | Syfert et al. |
| 5,445,836 A | * | 8/1995 | Agbo et al. |
| 5,529,796 A | | 6/1996 | Gobbo et al. |
| 5,780,086 A | * | 7/1998 | Kirksey et al. |
| 6,024,991 A | * | 2/2000 | Lehmberg et al. |
| 6,036,982 A | * | 3/2000 | Lehmberg et al. |

* cited by examiner

Primary Examiner—Anthony J. Weier

(57) ABSTRACT

A brewed tea concentrate is taught having about 5 to 30% tea solids, combined with selected carbohydrates in a ratio of 1.5 parts or more of carbohydrate to 1 part of tea solids. The brewed tea concentrate has certain levels of caffeine, flavanoids and gallic acid and when diluted to a final tea beverage at a ratio of about 100 parts water to 1 part tea has a total tea solids content of about 0.1% to 0.3% or higher. The beverage thus prepared has a Hunter haze of 50 or less.

12 Claims, 1 Drawing Sheet

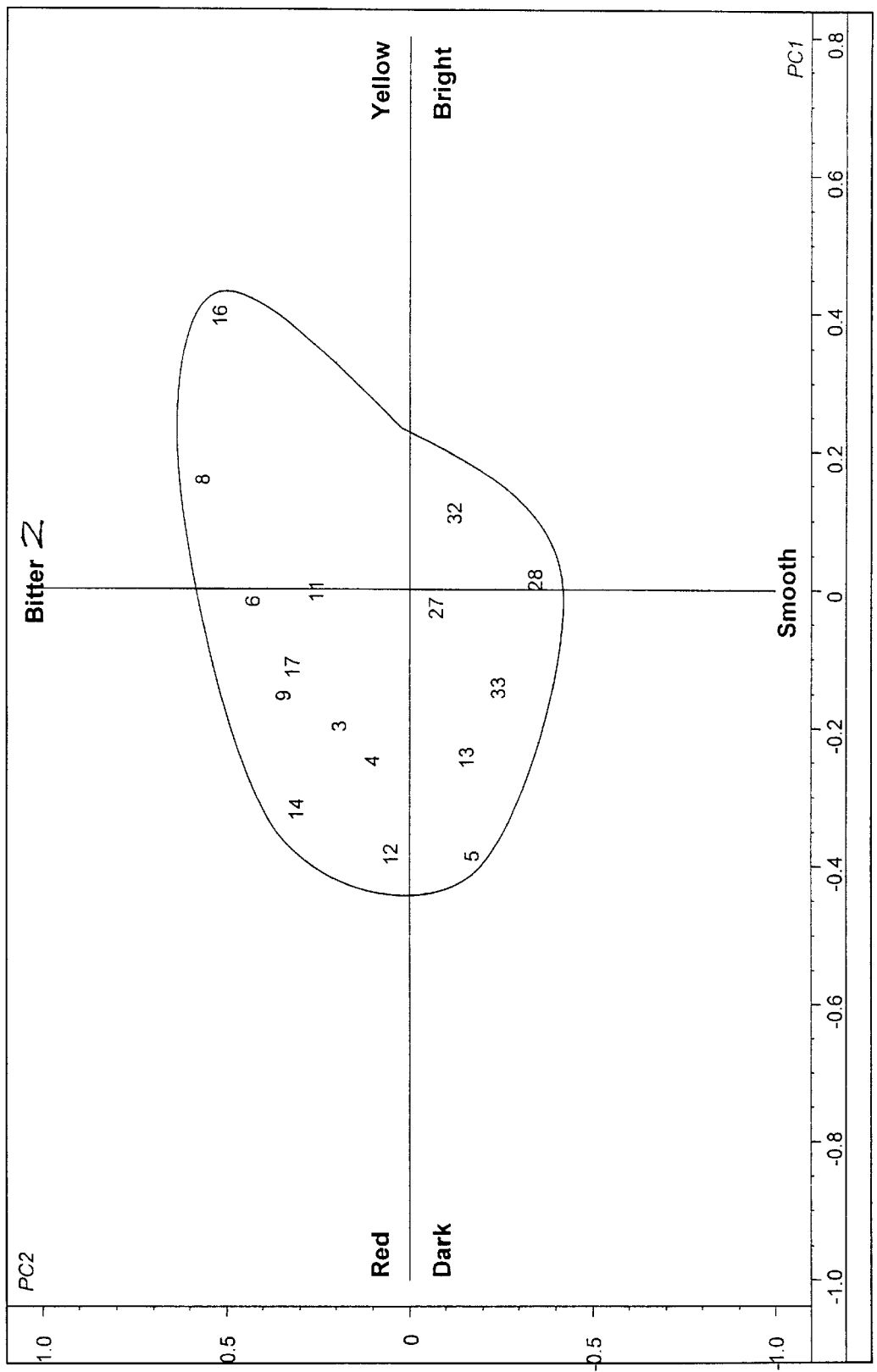

TEA CONCENTRATE

This application claims the benefit of U.S. Provisional Application No. 60/119,729, filed Feb. 12, 1999.

FIELD OF THE INVENTION

This invention generally relates to concentrated solutions or dispersions of tea extracts which may be used, if desired, in preparing iced tea beverages. Hot tea beverages may also be prepared using the invention.

Iced tea cannot be conveniently prepared by infusing traditionally manufactured tea leaves in cold water. Instead, the leaves are usually infused in hot water, removed, if necessary unless they are in a tea bag, and the beverage is then refrigerated until it is ready to consume. Alternately tea leaves, both loose and in bags, have been placed in water in sunlight to infuse slowly over a period of hours. A more convenient option is to prepare the iced tea beverage from a concentrated storage solution.

Shelf stable tea concentrates with high tea solids are highly desirable and have several applications. These include: the ability to supply a brewed tea concentrate for use in Ready-to-Drink tea and Fountain tea products; as a tea concentrate product for retail sale; and as a preferred method of transporting tea solids. One advantage of the tea concentrate of the invention over a powder or a dilute tea extract is that better tea character is obtained. In addition, less energy is employed in manufacturing than for a powder and less weight and volume are needed for shipping a concentrate, than for a dilute extract.

In the prior art, tea concentrates were considered to be physically unstable, which prevented their use in many tea products. However, it is believed that under certain conditions tea products made from tea concentrates have better quality (e.g., flavor, freshness, etc.) than powders and are more economical than tea powder or dilute tea extract. Therefore, it is highly desirable to have a shelf stable tea concentrate.

The addition of a selected level of high methoxy citrus pectin stabilizes tea products having about 0.1% tea solids and prevents haze and precipitation. This is disclosed in U.S. Pat. No. 5,529,796. However, the same approach to stabilize tea concentrates up to about 50% solids was not successful.

U.S. Pat. No. 4,748,033 disclosed the use of edible gums (xanthan gum, cellulose gums, locust bean gum, sugar gum and mixtures) to prevent floc formation during cyclic freezing and thawing, and to enhance cold water solubility. The solids level for the tea concentrate specified in the patent was 0.4 to 8% (w/w) and the use level of xanthan gum was 5–12% weight of gum to weight of tea solids.

U.S. Pat. No. 4,051,267 to Jongeling disclosed the use of carrageenans for suspending and stabilizing tannins in a tea extract which is transported in a frozen or chilled condition for use in vending machines. However, Jongeling found that the viscosity of the tea extract using xanthan gum was so high that the accuracy of dosing in the dispensing machine was impaired.

The use of individual gums or mixtures of gum with selected tea extracts has been disclosed. However, the current invention is very different from the teachings of the prior art. The prior art dealt with much lower levels of tea solids, 0.4–8%. Further, the prior art did not stabilize tea concentrates containing 15–25% of tea solids. Additionally, the prior art required low temperatures (refrigerated or frozen) to maintain the flavor, clarity, stability and shelf life of the products. Tea concentrates prepared by the current invention in contrast to the art are stable at ambient temperatures.

Concentrates or "Storage Solutions" labeled as tea have been prepared such as Ready Bru™ marketed by Beverage House however the product employs colorants and contains little, if any, actual tea solids. Rather it uses tea aroma and the like to give a final beverage on dilution that in some ways may vaguely resemble tea.

Real tea concentrates have also been prepared containing relatively low amounts of tea solids. These "fountain style" brands of concentrated syrup are shipped in bags and used in dispensers in restaurants and other types of distributors. These concentrates as compared to the concentrate or Storage Solutions of the instant invention are vastly different. Table 1 below gives typical formulations for current products and the inventive product.

TABLE 1

Comparison of Typical Fountain Tea Concentrates with the Invention

| Ingredient | Typical Fountain Tea Concentrate | Stabilized Brewed Tea Concentrate Of The Invention |
| --- | --- | --- |
| Tea Powder | 0.5% | |
| Tea Concentrate (50% solids) | | 32.40% |
| Tea Aroma/Tea Flavor | 0.7% | 11.41% |
| Preservative | 0.2% | 0.22% |
| Acidulant/Color | 0.8% | 3.04% |
| Water | 97.5% | 5.34% |
| Antifoam | 0.2% | |
| Citrus Pectin | 0.1% | |
| HFCS (71% solids) | | 47.60% |

Both tea concentrates are at a pH of approximately 4.2.

These prior art "tea concentrates" with solids concentrations at a level of 0% to 1.0% are more accurately described as dilute tea extracts. They have a relatively low concentration of tea and a relatively high concentration of preservative. On the one hand the low concentration of tea promotes stability in this dilute extract but the high concentration of preservative may be high enough to detract from taste when the extract is diluted to beverage strength.

In addition, at a relatively low concentration shipping includes high amounts of water and excess packaging. If the concentration of tea solids could be increased it would eliminate shipping many containers and much water. For example, currently "Fountain Teas" have a tea concentration of roughly 0.5% so that when they are diluted in current dispensers with a 5:1 water to tea extract ratio they will have a beverage strength of about 0.1%. If the concentration could be increased significantly it would require shipment of less water and there would be a concomitantly reduced need for packaging. The difficulty lies in stabilizing the higher concentrations of tea. Not only must the concentrated solution itself be stable both physically and microbiologically, but the beverage prepared from it must also have good physical and microbiological stability. Microbiological stability in the beverage is not quite as important because the beverage strength tea is usually consumed within minutes of being dispensed. In addition, when sufficient preservatives are used to protect the "concentrate" at higher tea solids they will be present in the highly diluted beverage at much lower amounts and are not noticeable in the taste.

The physical stability of a highly concentrated tea solids solution is very tenuous, especially at the acidic pH's used when preservatives are employed to maintain microbiological stability in the concentrated storage solutions.

Tea concentrates containing 10% to 30% tea solids have a pronounced tendency to separate and "cream" thus resulting in an unsightly product which cannot be easily handled and which cannot be used in standard diluting equipment.

Accordingly, a concentrated tea solution with a relatively high amount of tea solids is seen to be extremely desirable.

SUMMARY OF THE INVENTION

In order to achieve the goal of shelf stable tea concentrates which can be employed with the invention, selected amounts of carbohydrates such as sucrose, corn syrup, oligosaccharides, high fructose corn syrup and the like have been employed. High fructose corn syrup has been found to be the most effective carbohydrate. Tea extracts from continuous or batch extraction using specific enzyme treated or extracted tea leaves (i.e., green, black and oolong tea) are centrifuged and separated to achieve certain levels of clarity. The carbohydrate is added either before or after evaporation and preferably after to achieve a final concentration of 12 to 20% (w/w) on a tea solids basis of the concentrate. A shear force is used to mix the concentrate. The stabilized concentrate is pasteurized, aseptically packed or preserved and acidified to a pH below 4.6, and stored at ambient temperature. Products made from the concentrate have a fresh brewed tea flavor and good clarity.

The concentrate used with the invention has a concentration of brewed tea solids of about 5% to 30% preferably 12% to 20% and employs a companion carbohydrate, such as corn syrup, oligosaccharides, sucrose or preferably high fructose corn syrup (HFCS). This HFCS preferably has a DE of 42 or 55. The ratio of carbohydrate solids to tea solids is about 1 part carbohydrate to 1 part tea to about 2 or more parts carbohydrate to 1 part tea and preferably at least 1.5 parts carbohydrate to 1 part tea. The carbohydrate should be of a type and at a level such that it does not impart significant sweetness upon dilution to the beverage strength drink. Other materials may also be used but the total solids (solute) concentration including tea, carbohydrates and any other additives such as acidulants, preservatives and colorants, if desired, to ensure stability must be at least about 45% and preferably higher. Lower amounts may also be used of 30 to 45% but the stability will be affected. In order to insure the microbiological stability of the storage solution or "concentrate", a pH of about 4.6 or lower is used and as mentioned above, this may contribute to the physical instability of the concentrate. Of course, if the tea concentrate is processed thermally and aseptically packaged, a higher pH such as the native pH of tea of about 5.0 or higher may be used instead of a pH of 4.6 or less.

The preferred preservatives are sorbate and benzoate, preferably sodium benzoate and potassium sorbate. Typical beverage strength iced teas prepared from current fountain tea dilute extracts contain about 100–200 ppm each of sorbate and benzoate because of the lower amount of total solids in the extracts of the art, but the concentrate of the invention, which is roughly 20 times more concentrated, reduces this level in the beverage strength to about 10 to 12 ppm. Lower amounts of preservatives in the final beverage are beneficial for taste.

The viscosity of the brewed tea concentrate is 10 to 200 centipoise as measured by a Brookfield LVT Viscometer with a #2 spindle at 60 rpm and a 25° C. temperature. Further, this brewed tea concentrate must produce a "brewed" tea flavor as judged by trained tea tasters when diluted to a level of about 0.2%–0.35% tea solids and must also have a Hunter haze value of 50 or less as measured on a Hunter DP9000 spectrophotometer in a 5 cm. cell.

Further, this concentrate of the invention must be made from real tea and must contain about 0.4% to 2.0% caffeine, about 3.0% to 11.0% flavanoids, and about 0.3% or higher gallic acid.

The shelf life and consequently the physical stability of the storage solution or "concentrate" must be at least about 9 weeks when stored at a temperature of about 70° F.

Based on the solids concentration, the specific gravity of the concentrate will vary between about 1.21 g/cc and about 1.32 g/cc.

The tea extract used in the concentrate can be produced by any convenient process, but it is especially preferred to employ tea with selected cell wall digesting enzymes such as viscozyme. The prepared tea will also be clarified by standard means but preferably in a centrifuge at native pH of 5.0 or below and at a solids concentration of 4 to 15%. As mentioned above, any process will be operative but to insure low haze and increased stability the process employing cell wall digesting enzymes is preferred.

DETAILED DESCRIPTION OF THE INVENTION

Black teas, particularly those selected to have a low cream index and which produce highly colored infusions are essentially preferred for the process but, of course, Green and Oolong teas may also be employed if appropriate care is taken.

Particularly preferred are tea concentrates prepared from black tea treated with a combined enzyme system of at least one cell wall digesting enzyme.

In particular these concentrates are prepared by treating tea leaf with an enzyme cocktail including selected cell wall lysis enzymes such as carbohydrases including cellulase and mascerase, for example, Viscozyme™L obtainable from NOVO Industri A/S Denmark. Preferably black tea leaf is used.

The enzymes are fed to a black tea/water slurry in an extractor at low temperature to obtain a tea extract slurry. The enzymes, if more than one is used, can be combined into a cocktail or can be fed to the extractor individually. The tea extract slurry containing the enzymes is then hot extracted to complete the extraction process and the tea leaf is separated from the tea extract. The tea extract is then preferably pasteurized. This heat treatment deactivates the enzymes. The separated or decanted tea extract may then be stripped, if desired, to collect additional aroma.

The stripped extract is optionally first concentrated and then cooled and clarified by centrifugation or other clarification methods such as filtration and the like. After clarification, the extract is then again concentrated, preferably by vacuum.

A particularly preferred method of preparing the concentrate is as follows:

About 5 to 20 parts and preferably 5 to 8 parts by weight of water based on the eight of tea leaf is heated to between about 70° F. and 145° F., preferably 120° F. to 140° F. The water is added to the tea leaf and an enzyme mixture consisting of any combination of cell wall lysis enzymes, for example carbohydrases such as cellulase, pectinase, and mascerase are metered continuously into the extractor. The extractor can be jacketed or insulated to aid in temperature control. The flow of tea leaf, water and enzymes through the extractor is preferably co-current. The length, diameter and flow rates of the system are such that they provide a minimum contact time of at least 20 minutes, preferably at least 60 minutes. The maximum is about 2 to 5 hours or more, depending upon the degree of extraction desired balanced against economics.

The resulting slurry can be separated into extracted tea leaf and extract or be sent on for further batch or continuous higher temperature extraction. The extract is then optionally aroma stripped by conventional means and adjusted to the desired solids level, cooled and centrifuged to remove insoluble material. The extract is then concentrated to about 30% tea solids or higher for batching with other ingredients to form the final storage solution or concentrate.

Enzyme Preparation

The enzyme cocktail, if more than one enzyme is used, is prepared by mixing selected cell wall-digesting enzymes together with enzyme stabilizing agents such as sorbitol and the like in water. Then enzymes may be mixed together. It is also possible to introduce the enzyme separately into the extractor.

Enzyme Extraction Operation

The tea leaf is fed to the enzyme extractor together with fresh water and enzyme solution. All three components flow co-currently through the extractor. Other methods of delivering an appropriate residence time are also acceptable. The extractor is preferably temperature controlled by jacketing or the like.

The enzyme extractor preferably provides about 20 minutes to about 5 or more hours of residence time for the enzyme solution to be in contact with the leaf. Temperature control is important to maximize the effect of the enzymes.

Extraction

Following the enzyme extraction step, the leaf slurry is fed into an extractor at a temperature of about 70° F. to 210° F., preferably 100° F. to 190° F. This completes the extraction of the leaf. The ratio of leaf to water in this extraction is about 4 parts to 10 parts water to 1 part leaf.

Pasteurization

If pasteurization is desired, decanted extract from the hot extraction step is pumped at about 2% to 5% tea solids to the Pasteurizer. Pasteurization is accomplished by raising the temperature of the extract to a minimum of about 190° F. The hot extract is then held for about one to ten minutes of residence time to destroy any microorganisms that might be present in the extract. The pasteurization step also denatures the enzymes and stops their activity.

The pasteurized extract is then stripped of aroma if desired and concentrated to the appropriate level for centrifugal clarification.

Centrifuge Operation

The extract temperature should be about 140° F. or less, preferably about 55° F. to 90° F. The extract is fed to a centrifuge where it is spun for nominally 2 minutes at approximately 8,000 times gravity. The sludge is disposed of and the clarified extract retained for concentration. The extract is centrifuged at about 4% to about 15% tea solids at a pH of about 5.0 or less.

Preferred Embodiment

In a preferred process of this invention, black tea leaf is mixed with an enzyme cocktail at a weight ratio of from about 0.005 to 0.010 part of enzyme to 1 part of tea leaf preferably 0.007 to 0.008 parts enzyme per part tea leaf. The enzyme solution contains one or more cell lysis enzymes. Preferably, the enzymes solution contains from about 0.33 to 0.66 FBG of carbohydrase per gram of black tea. The tea is extracted with the enzymes at a temperature of from 70° F. to about 145° F. for from 20 minutes to 5 hours or more. The enzymes are inactivated by heating to a temperature greater than about 150° F. and preferably about 190° F. or above and the tea is then ready for further processing in accordance with the invention. Conventional extraction, aroma stripping, pasteurization and centrifugation are employed.

Enzyme Solution

By "cell wall-digesting enzyme" herein is meant an enzyme or enzymes which breaks down one or more tea cell wall constituents to simpler materials and thus reduces the structural integrity or increases the permeability of the cell wall. Plant cell walls are composed primarily of cellulose, but contain lesser amounts of proteins, hemicellulose, pectins, and lipids. Accordingly, cell wall-digestive enzymes include carbohydrases such as cellulase, hemicellulase, pectinase and dextranase as well as protease, lysozyme and lipases, for example, NOVO Industries' U.S. Pat. Nos. 4,478,939 and 4,483,876 describe SPS-ase activity. The cell wall digesting enzymes, such as cellulase, pectinase, and hemicellulase can be obtained from commercial enzyme sources.

One cell wall digesting enzyme is Viscozyme™L obtainable from NOVO. Viscozyme 120 L is a multi-enzyme complex containing a wide range of carbohydrases including arabinose, cellulase, β-glucanase, hemicellulase and xylanse. The enzyme also has activity against the branched pectin like substances found in the soy bean cell walls.

The enzyme preparation is produced from a selected strain of the Aspergillus group. The product has an enzyme activity of 120 FBG/ml. (Fungal β-Glucanase). The analytical method is available from NOVO.

Once the clarified tea extract has been prepared by the enzymatic treatment of the invention, it is then concentrated by means well known in the art. Preferably the concentrates are prepared by evaporation under vacuum. The preferred conditions if evaporation is used are a temperature of about 115° F. to 195° F. and a pressure of about 1.5 psia to about 10 psia. In this way the extract can be concentrated without having a negative impact on the organoleptic properties of the tea. A commercial rising or falling film evaporator is usually employed. Once the tea is concentrated to an appropriate level, a selected carbohydrate is then added to stabilize the concentrate.

The tea extract can be concentrated to any level which is high enough to achieve the desired tea solids concentration in the final storage solution or concentrate and low enough to still be fluid enough to be workable. Levels of about 30% or higher and preferably about 45% or higher to about 70% are preferred for ease of handling.

As used herein, the terms "tea concentrate" or "tea concentrate solution" refers to a product derived from concentrated tea extract which is diluted with water to form a drinkable tea beverage. Tea concentrates of the present invention comprise from about 5% to about 30% tea solids. Preferred tea concentrates of the present invention comprise from about 12% to about 20% by weight tea solids. The tea concentrates of the present invention are in liquid product form.

As used herein, the term "tea beverage" refers to a drinkable beverage prepared from the tea concentrates of the present invention by dilution with water. The dilution water is usually municipal water, but deionized water can be used to advantage. If the municipal water has a hardness of over about 200 ppm as $C_aCO_3$, the haze of the beverage may be adversely affected so caution is required. Concentrates of the present invention are generally diluted with sufficient water to provide the tea beverage. Preferred tea concentrates are typically diluted to about 0.1% to 0.35% tea solids to provide the tea beverages.

As used herein, the term "tea solids" refer to those solids normally present in a tea extract. Polyphenolic compounds are normally the primary component of tea solids. However, tea solids can also include caffeine, proteins, amino acids, minerals and carbohydrates.

As used herein, the word "comprising" is intended to mean including but not necessarily "consisting essentially of", "consisting of" or "composed of". In other words, "comprising" the listed steps or options need not be exhaustive.

EXAMPLE 1

Evaluation of Iced Tea by Qualitative Descriptive Analysis (Q.D.A.)

The color and flavor, including mouthfeel, of iced tea beverages govern their acceptability. A Qualitative Descriptive Analysis (Q.D.A.) test method was selected to systematically characterize and quantify tea beverages based on color, flavor, and mouthfeel. The Q.D.A. method employs a trained panel of expert tasters to quantify the color, flavor and mouthfeel attributes of iced tea beverages relative to defined reference standards.

Expert tasters were chosen by screening prospective panel members for ability to taste standard solutions of acid (citric acid), salt (sodium chloride), sweet (sucrose), and bitter (caffeine) that represent high to low levels (grams per liter) of each flavor attribute as defined in the following table.

| Acid | Bitter | Salt | Sweet |
|------|--------|------|-------|
| 0.6  | 0.5    | 2.0  | 12.0  |
| 0.4  | 0.3    | 1.0  | 4.3   |
| 0.2  | 0.2    | 0.5  | 1.6   |
| 0.1  | 0.1    | 0.2  | 0.5   |

Individuals who were able to identify and differentiate the flavor of each test solution at the lowest concentration qualified for participation as an expert taster and were trained to describe and quantify tea beverages using a defined set of attributes to describe color, flavor and mouth feel.

Through a mathematical technique known as Principle Component Analysis four attributes, bitterness (also called bitterness2 or bitter 2 in this application which refers to the bitter aftertaste rather than initial bitterness), smoothness, redness and yellowness were found to be useful for differentiating iced tea beverages. Expert panelists (a minimum of eight) were selected and trained to describe iced tea beverages by rating the intensity of each key attribute (bitterness, smoothness, redness, and yellowness) on a scale of 1–10 by exposing the tasters to extremes of each attribute. For example an infusion of whole leaf Darjeeling tea may be used to define bitterness and yellowness and an infusion of Argentine tea may be used as an example of redness and smoothness. Once trained the expert tasters were tested through blind evaluations of iced tea beverages representing low to high levels of each attribute, provided in random order. Expert tasters evaluated each sample at least 3 times to be assured that panelist ratings were consistent and reproducible. To determine the range of attributes that defines hot brewed iced teas, a variety of teas that represent a broad sampling of the world of teas were evaluated by the trained panel after being prepared by three distinct methods of brewing. All of the water was carbon-filtered tap water. Brewing Method 1 (full flavored brew method) involved the preparation of a concentrate followed by dilution to final beverage strength. Six pitcher or family size tea bags each containing about 7.13 grams of tea leaf were brewed in two quarts of hot freshly boiled water for 30 minutes followed by dilution to beverage strength with an additional two quarts of cold water making a gallon of beverage. Brewing Method 2 (mild flavored brew method) was a single strength infusion rather than a concentrate preparation. In contrast to Method 1, the tea bags were brewed with the full amount of boiled water (four quarts) for three minutes.

Product evaluations were conducted in Sensory booths where the trained expert tasters ranked the teas on a 1–10 scale for bitterness, smoothness, redness, and yellowness. The samples were served blind, identified only by a three-digit code and presented in three replications using a balanced block design. Flavor assessment was done under red lights. Appearance was done under white light. The result of this type of test over several different panels, while possibly not being an exact match as to absolute values, will still statistically show the same relative differences between the products.

The method for defining the teas is as follows: by plotting each color attribute (red or yellow) vs. a mouthfeel attribute (bitter or smooth), using averaged scores of the panelists, plots are produced which show the inventive tea as being similar to regular brewed teas.

The defining region of the group, or Q.D.A. map that relates to the invention, is shown in FIG. 1. The type of tea, the method of brewing and the data points generally produced by a Q.D.A. analysis are reported in Table 1 below.

TABLE 1

Tea type; Brewing Method; Q.D.A. Score

| | Samples | Average of Q.D.A. Attributes | | | |
|---|---|---|---|---|---|
| ID | Description | Smooth | Bitter2 | Red | Yellow |
| #03 | Lipton ® Cup - 3 minute hot brew | 7.3 | 4.2 | 5.5 | 4.5 |
| #04 | Lipton ® Family - 3 minute hot brew | 7.2 | 3.6 | 5.8 | 4.3 |
| #05 | Luzianne ® - 3 minute hot brew | 7.8 | 2.5 | 6.6 | 3.5 |
| #06 | Kenyan - 3 minute hot brew | 6.6 | 4.8 | 4.5 | 5.5 |

TABLE 1-continued

Tea type; Brewing Method; Q.D.A. Score

| | Samples | Average of Q.D.A. Attributes | | | |
|---|---|---|---|---|---|
| ID | Description | Smooth | Bitter2 | Red | Yellow |
| #07 | Superdust - 3 minute hot brew | 6.9 | 3.9 | 8.5 | 1.9 |
| #08 | Ceylon - 3 minute hot brew | 6.3 | 5.3 | 3.6 | 6.4 |
| #09 | Assam - 3 minute hot brew | 6.4 | 4.4 | 5.2 | 4.9 |
| #10 | Darjeeling - 3 minute hot brew | 4.7 | 6.3 | 2.5 | 7.7 |
| #11 | Lipton ® Cup - 30 minute hot brew | 6.9 | 4.0 | 4.5 | 5.5 |
| #12 | Lipton ® Family - 30 minute hot brew | 7.3 | 3.4 | 6.5 | 3.6 |
| #13 | Luzianne ® - 30 minute hot brew | 7.8 | 2.7 | 6.0 | 4.1 |
| #14 | Kenyan - 30 minute hot brew | 6.4 | 4.3 | 6.1 | 4.0 |
| #15 | Superdust - 30 minute hot brew | 7.4 | 3.3 | 6.2 | 3.9 |
| #16 | Ceylon - 30 minute hot brew | 6.5 | 5.0 | 2.4 | 7.9 |
| #17 | Assam - 30 minute hot brew | 6.6 | 4.5 | 5.1 | 4.9 |
| #18 | Darjeeling - 30 minute hot brew | 5.2 | 6.4 | 1.8 | 8.8 |

FIG. 1 generally represents a Q.D.A. map comparing selected aspects of the tea as measured by the panelists.

QDA testing was performed as above and the beverage strength teas prepared were judged to be "tea like" in comparison to a standard.

Nos.
   27—standard brewed tea
   28—brewed tea concentrate of the invention 1:100 dilution
   32—brewed tea concentrate of the invention 1:100 with added flavor 1
   33—brewed tea concentrate of the invention 1:100 with added flavor 2

The relative placement that results indicate that the world of teas along with tea beverage prepared from the described inventive tea concentrate are quite similar in tastes. The defining region of the group, or Q.D.A. map that relates to the invention as shown in FIG. 1.

FIG. 1 is a plot of the values of bitter 2 and smooth on the Y axis and red/yellow on the X axis, Number 28, the concentrate of the invention, is very close to the standard brewed tea.

EXAMPLE 2

A further performance test was performed as follows:

A brewed tea concentrate for iced tea preparation is sought that is not discernibly different in sensory characteristics from Fresh Brewed Iced Tea. Lipton's Food Service Tea Leaf blend, brewed using an automatic drip type brewing machine, was selected to be the standard for Fresh Brew. A degree of difference test with employees was performed which indicated that a pre-sweetened 1:100 tea concentrate of the invention was not perceivably different from the pre-sweetened Fresh Brew standard at the 95% confidence level. Test results on unsweetened prototypes indicated that while all prototypes were discernibly different from the unsweetened Fresh Brew standard, the difference was termed 'very slightly' to 'slightly' different.

For the current test, confirmatory degree of difference testing was conducted with consumers, screened to be users of iced tea in restaurants. This test was unique in that consumers participated in an "analytical" type test, rather than a consumer liking test. Two tests were conducted (N=54 per test), one on pre-sweetened and one on unsweetened samples. In each test, the Fresh Brew standard and three prototypes of the brewed tea concentrate invention were evaluated using a degree of difference scale to determine whether there were perceivable sensory differences between Fresh Brew and prototypes, and if so, what the magnitude of the difference was.

Test results confirm those previously obtained with the employee panels. Both external consumers and employees exhibited the same degree of sensitivity in discerning differences among samples. Pre-sweetened prototypes were not found to be significantly different from the pre-sweetened Fresh Brew standard at the 95% confidence level. Unsweetened prototypes were found to be perceivably different from Fresh Brew. However, the magnitude of the difference may still be within an acceptable range.

Sample Information

Test 1: Plain/Sweet Iced Tea

| Sample | Variable | Description |
|---|---|---|
| Control (Reference & Control) | Fresh Brewed Tea | Standard: Lipton Food Service Tea Leaf Blend, brewed using the automatic drip brew method. |
| Prototype 1 | Unflavored | Brewed tea concentrate of the invention at 1:100 - no added flavor |
| Prototype 2 | Flavor 1 | Brewed tea concentrate of the invention at 1:100 with flavor. |
| Prototype 3 | Tea blend with flavor | Brewed tea concentrate of the invention using an alternate tea leaf blend and flavor |

Test 2: Plain/Plain Iced Tea

The same samples as in Test 1 were evaluated plain.

Sensory Methods

Consumers were screened via telephone. Qualified respondents were between the ages of 21–64 and had consumed Iced Tea in restaurants this past summer. Respondents were recruited to attend one of two panel sessions. In the first test (N=54), samples were evaluated pre-sweetened, by consumers who drink sweetened iced tea in restaurants. In the second test (N=56), the same variables were evaluated plain, by consumers who drink either plain or sweetened iced tea in restaurants.

Samples were served directly from the refrigerator and were evaluated in the test booths under red lights to mask any color differences. Testing was conducted using a computerized sensory analysis system. Samples were evaluated in a complete block, balanced order design. A water rinse and cracker were used to clear the palate during a one-minute rest between samples.

In each test, each panelist received a reference sample, the Fresh Brew Standard, (which was always the Control), and a set of blind coded samples consisting of a Blind Control and three brewed tea concentrate prototypes of the invention. Panelists were requested to rate each coded sample as to the degree of difference from Control. A nine point Degree of Difference scale was used, see below. Panelists were informed that one of the blind coded samples might be the same as the Control. Prior to the test, panelists were given verbal instructions on degree of difference testing and how to use the rating scale for evaluating their samples.

The mean difference from the reference (Control) was calculated for both the Blind Control and each of the test samples. An analysis of variance was performed to determine if the test samples were within the range of difference seen between the Control and the Blind Control. Results for Plain/Sweet samples indicate that at the 95% confidence level, there are no perceivable differences between the Fresh Brew Standard and two of the brewed tea concentrate prototypes of the invention (the 1:100 sample with no added flavor and the 1:100 sample with flavor). The Blind Control was rated "slightly different" from itself (Control), which is a measure of the placebo effect. The two above prototypes were rated between "slight" and "slight to moderately different" from control. The 1:100 prototype made from an alternate tea leaf blend with flavors was found to be significantly different from the Fresh Brew Standard.

When samples were evaluated plain (unsweetened), all prototypes were found to be discernibly different (i.e. significantly different at the 95% confidence level) from Fresh Brew. That is, the degree of difference between each prototype and the Control was greater than the placebo effect. As in the Plain/Sweet test, the Blind Control was rated "slightly different" from itself (Control). All three prototypes were rated between "slight to moderately different" and "moderately different" from Control, whereas the first brew control was rated very slightly different to slightly different from itself.

Degree of Difference Tests:

Test 1: (Plain/Sweet)

Test 2: (Plain/Plain)

Results

TABLE 2

DEGREE OF DIFFERENCE

Plain Iced Tea
Evaluation of Control - Fresh Brew (FB)
Vs.
Brewed Tea Concentrate Prototypes of the Invention A mean rating of 1.0 is equal to "No Difference" from the Reference (Control). See Degree of Difference scale on next page. The higher the rating, the greater the perceived difference from Fresh Brew.

| Sample | Test #1 Plain/Sweet (n = 56) | Test #2 Plain/Plain (n = 54) |
|---|---|---|
| Blind Control (Fresh Brew) | 3.0 a* | 3.0 a |
| Brewed tea concentrate of the invention at 1:100 - no added flavor | 3.8 ab | 4.3 b |
| Brewed tea concentrate of the invention at 1:100 with flavor | 3.8 ab | 4.5 b |
| Brewed tea concentrate of the invention using an alternate tea leaf blend and flavor | 4.3 bc | 4.7 b |

All samples were produced with carbon filtered water.
*Within a column, means sharing a common letter with the Blind Control are not significantly different from Fresh Brew Control at $p = 0.05$.

All samples were produced with carbon filtered water.

| | | | | Degree of Difference Scale* | | | | |
|---|---|---|---|---|---|---|---|---|
| 1 | 2 | 3 | 4 | 5 | 6 | 7 | 8 | 9 |
| No Difference | Very Slight Difference | Slight Differ Difference | Slight to Moderate Difference | Moderate Difference | Moderate to Large | Large Difference | Very Large Difference | Extremely Large Difference |

*Difference from Reference (Control)

It is understood that the examples and embodiments described herein are for illustrative purposes only and that various modifications or changes in the light thereof will be suggested to persons skilled in the art and are to be included within the spirit and purview of this application and the scope of the appended claims.

What is claimed is:

1. A brewed tea concentrate having a total tea solids concentration of about 10% to about 30%;

carbohydrate at 1.5:1 ratio carbohydrate to tea solids or higher;

preservative at 0.1% to 0.5%;

water at 40% to 60%;
gallic acid at 0.3% or higher;
flavanoids at 3.0% to 11.0%;
caffeine at 0.4% to 2.0%;
pH of about 5.0 or less; and
specific gravity of 1.21 to 1.32;
total solids concentration of 45% or higher, wherein when diluted at a ratio of one part concentrate to 100 parts water, the resulting beverage strength tea has at least 0.1% tea solids.

2. The concentrate as defined in claim 1 wherein said carbohydrate is high fructose corn syrup or corn syrup at a ratio of 1.5 parts of said carbohydrate to 1 part of said tea solids.

3. The concentrate as defined in claim 1 wherein said total solids concentration is 50% or higher.

4. The concentrate as defined in claim 1 wherein said beverage strength tea has at least 0.3% tea solids.

5. The concentrate as defined in claim 2 wherein said high fructose corn syrup has a DE of 42 or 55.

6. The concentrate as defined in claim 1 wherein said brewed tea concentrate contains about 12% to about 20% tea solids.

7. The concentrate as defined in claim 1 wherein said brewed tea concentrate contains about 17% tea solids.

8. The concentrate as defined in claim 1 wherein said water is deionized water.

9. The concentrate as defined in claim 1 having a pH of about 4.6 or less.

10. A brewed tea concentrate having a total tea solids concentration of about 17%;
high fructose corn syrup of DE 42 or 55 or corn syrup at 1.5:1 ratio of high fructose corn syrup or corn syrup solids to tea solids or higher;
sodium benzoate and potassium sorbate at a combined concentration of 0.1% to 0.5%;
water at 40% to 60%;
gallic acid at 0.3% or higher;
flavanoids at 3.0% to 11.0%;
caffeine at 0.4% to 2.0%;
pH of about 4.6 or less;
specify gravity of 1.21 to 1.32;
whereby when diluted at a ratio of one part concentrate to 100 parts water, the resulting beverage strength tea has at least 0.35% tea solids.

11. A dilute aqueous tea beverage composition containing 0.1% to 0.35% tea solids, said beverage having been prepared by diluting the concentrate of claim 1 at a ratio of about 100 parts of water to about 1 part concentrate whereby said beverage has a Hunter haze of less than 50.

12. A dilute aqueous tea beverage as defined in claim 11 wherein the water used to dilute the concentrate is deionized water.

* * * * *